Sept. 17, 1963 E. A. HOLMES ETAL 3,104,355
CORROSION MEASURING PROBE WITH A TEMPERATURE
COMPENSATING ELEMENT IN A WHEATSTONE
BRIDGE AND METHOD OF USING SAME
Filed April 18, 1955 2 Sheets-Sheet 1
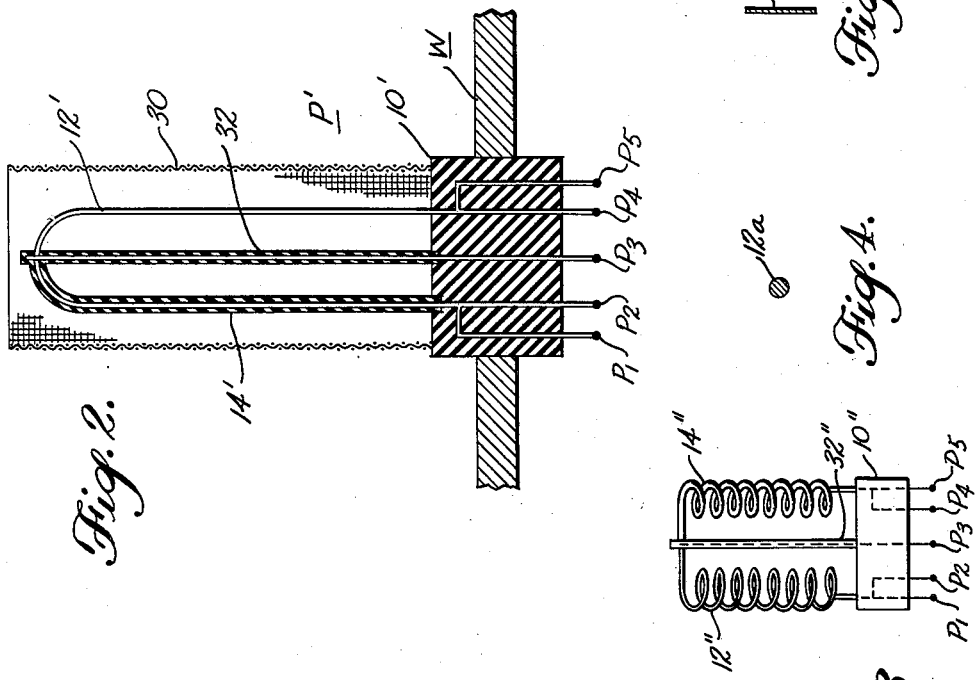
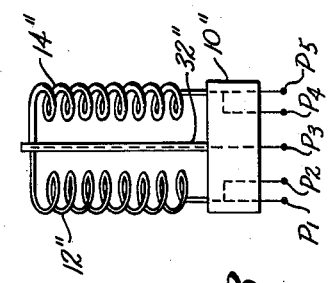
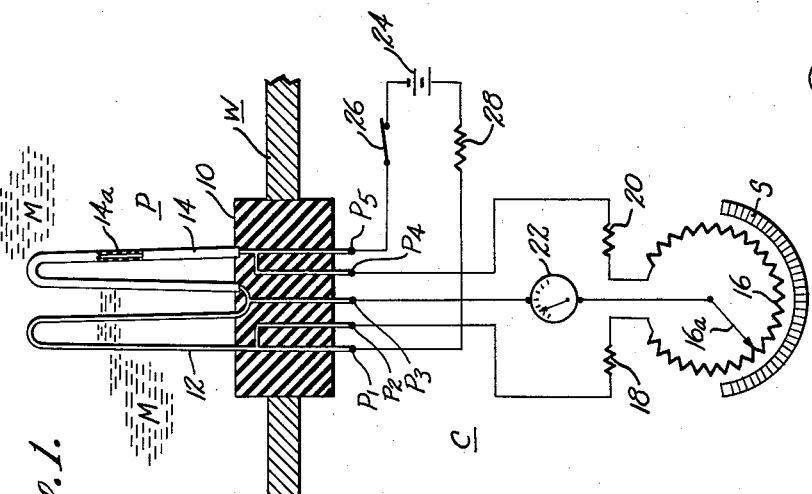
INVENTORS:
ELMOND A. HOLMES
GILSON H. ROHRBACK
BY WILLARD R. SCOTT, Jr.
Reynolds, Beach & Christensen
ATTORNEYS Sept. 17, 1963 E. A. HOLMES ETAL 3,104,355
CORROSION MEASURING PROBE WITH A TEMPERATURE
COMPENSATING ELEMENT IN A WHEATSTONE
BRIDGE AND METHOD OF USING SAME
Filed April 18, 1955 2 Sheets-Sheet 2

INVENTORS.
ELMOND A. HOLMES
GILSON H. ROHRBACK
WILLARD R. SCOTT, Jr.
BY

Reynolds, Beach & Christensen

ATTORNEYS

United States Patent Office 3,104,355
Patented Sept. 17, 1963

3,104,355
CORROSION MEASURING PROBE WITH A TEMPERATURE COMPENSATING ELEMENT IN A WHEATSTONE BRIDGE AND METHOD OF USING SAME
Elmond A. Holmes, Alderwood Manor, and Gilson H. Rohrback and Willard R. Scott, Jr., Seattle, Wash., assignors, by mesne assignments, to Magna Products, Inc., Santa Fe Springs, Calif., a corporation of California
Filed Apr. 18, 1955, Ser. No. 502,064
21 Claims. (Cl. 324—71)

This invention relates to a novel method and apparatus for measuring corrosiveness of a medium or corrosion of an object in a corrosive medium. An object hereof is to perform such measurements without removing the corrosible object from the medium and without removing any test coupons or fluid specimens therefrom as in past practices. The invention is herein illustratively described by reference to the presently preferred form thereof; however, it will be recognized that certain variations and modifications therein may be employed without departing from the inventive concepts. Likewise, it will be understood that the inventive principles may be practiced in various different applications and without regard to whether the medium be liquid, gaseous or otherwise.

Corrosion measurement by prevailing methods is a combined field and laboratory procedure, hence time consuming and expensive. In some situations it is impracticable. According to one conventional technique test coupons are placed in the corrosive medium and at the desired intervals are removed therefrom in succession for determining the amount of corrosion taking place in the intervening time intervals. One laboratory method for making this determination has been to scrape off the corrosion product carefully and measure the resultant weight loss of the coupon. Another has been to measure the increase of electrical resistance of the coupon. In a somewhat different method the metal content of effluent fluids from the corrosive medium was measured. In every such case, the steps of inserting and removing coupons or the extraction of fluid specimens followed by laboratory analysis were required.

In accordance with the present invention these steps are obviated and the desired measurements may be made very quickly in situ; laboratory skill and facilities are not required. Only a minimum of equipment is needed, and this may be portable; moreover, the data may be recorded automatically if necessary. Any test elements installed in the corrosive medium have a relatively long useful life and permit the making of corrosion measurements as frequently as desired without interrupting the normal usages or occurrences of and in the surrounding medium.

While not limited to such application, a specific object of the invention is to provide a method and apparatus for conveniently measuring corrosion of underground equipment in producing oil wells. For example, the former expensive practice of pulling oil well tubing primarily for inspection purposes may now be eliminated. In some cases only partially corroded tubing was discarded after such inspections because the cost of replacing the tubing for using it over its remaining life would be more than substituting new tubing for the old in the first instance. With the present invention the amount of corrosion and rate of corrosion of the tubing may be measured regularly and at any of different depths in the well. The correct time for tubing replacement is thereby determined accurately without taking the oil well out of production.

With these and other objects in view the improved method as herein disclosed involves the mounting of a relatively thin electrical resistance element directly in the corrosive medium to undergo corrosion therein, and the making of resistance measurements of the element in situ at selected times for determining corrosion of the element by the change of electrical resistance caused by corrosion. Being relatively thin at the outset a readily measurable change in the electrical resistance of the installed element takes place accompanying even a small amount of corrosion thereof, since the corrosion products depositing on the surface of the element are substantially non-conductive. Corrosion of the element is thus measured by readings taken either continuously (as by recording resistance variation) or at selected intervals. The resistance element is formed of a material similar in its corrosibility to any object to be monitored for corrosion in the medium. The resistance element is permitted to remain in the medium throughout its useful life and is replaced if necessary only after its thickness has been depleted to a degree impairing the reliability thereof or the calibrational accuracy of the metering apparatus employed in the resistance measurements.

Preferably the corrosion-determining resistance measurements are taken by means of a sensitive bridge-type galvanometer circuit. The metering circuit used may be incorporated in a portable unit for connection to test elements permanently installed at different locations, such as at different oil wells, or, if desired, may be a fixed and integral part of a single installation. It may be calibrated in units of corrosion so that the total corrosion of the monitored object may be read directly on the meter, or it may be calibrated in a way permitting convenient determination of rate of corrosion at any time, utilizing successive readings separated by a known time interval.

An important additional feature of the invention resides in the use of a test probe employing two similar electrical resistance elements one of which is exposed to the corrosive action of the medium, and the other of which is protectively coated against such corrosion but is subjected to any temperature changes that may take place therein affecting the first element. By connecting the two elements in opposite sides of a galvanometer type bridge circuit, for instance, the resulting corrosion-indicating resistance readings will be automatically compensated for the effect of temperature changes in the medium.

Corrosion-indicating resistance measurements compensated for temperature variations in the medium may also be made by employing a second or compensating resistance element of a material similar to the first element and which is exposed to the medium to corrode with the first element. In this case, however, the second element has a materially larger cross-section than the first element so that its resistance changes with corrosion at a measurably different proportional or percentage-wise rate than the change occurring in the first element. In general the temperature compensating feature involving use of a second resistance element placed in the medium with the first or corrosible test element is realizable in any arrangement or construction of the elements wherein the first element undergoes a change of resistance due to the corrosive action of the medium at a greater proportional rate than does the second element, which may or may not corrode, but where both such elements are subjected to substantially equal proportional resistance changes caused by temperature variations in the medium.

These and other features, objects and advantages of the invention, including certain details of the illustrative embodiments thereof will become more fully evident from the following description by reference to the accompanying drawings.

FIGURE 1 is a schematic diagram illustrating one form of the corrosion measuring apparatus.

FIGURE 2 illustrates a modified test probe which may be substituted for that employed in FIGURE 1.

FIGURE 3 illustrates a second modified test probe which may be substituted for that used in FIGURE 1.

FIGURES 4 and 5 illustrate cross sections of two of different alternative resistance element forms useful in the apparatus.

Figure 7:
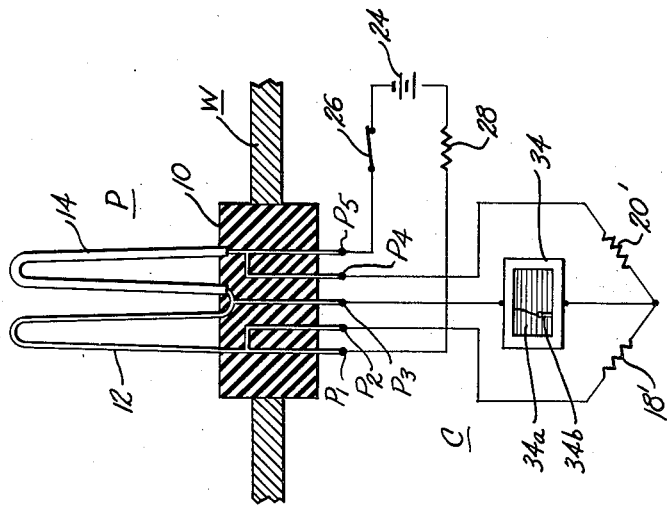
FIGURE 7 is a schematic diagram of a second modified system for measuring corrosion following the basic procedure indicated in FIGURE 1.

Referring to FIGURE 1, the illustrated apparatus consists of two principal components, the probe P and the metering circuit C connected to the electrical terminals in the probe for making resistance measurements hence corrosion determinations. The probe is inserted in the corrosive medium M through a suitable opening formed in a support W which may comprise a barrier or container wall separating the medium from an adjoining space suitable for occupancy by the metering circuit apparatus. The illustrated wall W is, of course, symbolic only and may be any suitable support for the probe P if any separate support is required. For example, the wall W may be the wall of a section of oil well tubing and the medium M may be the production fluids of the well including crude petroleum and the associated corrosive fluids brine, carbon dioxide, etc.

The probe P comprises the insulating base 10 mounted in support W and carrying two electrical resistance elements 12 and 14 thereon to project into the corrosive medium M in the mounted position of the probe. In the illustration the two electrical resistance elements are initially similar. They are formed as loops of fine wire of a material the corrosion of which by the medium is to be measured. If the corrosive action of oil well production fluids on the ferrous tubing W is of interest as illustrated, then the resistance element 12 is formed of an iron or steel similar to that in the tubing, and the resistance element 14 will be of a material which is similar thereto at least with respect to temperature coefficient of electrical resistance change. The resistance element 12 is exposed throughout its projecting length to the corrosive action of the medium M, whereas the resistance element 14 is protected against corrosion by a thin coating 14a of suitable material such as a plastic substance which is inert to the corrosive fluids, but such coating is not of sufficient thickness to afford appreciable thermal insulation of element 14 from the medium. As a result electrical resistance element 14 does not corrode, whereas element 12 corrodes at the same rate as the tubing wall W. Both resistance elements are subjected to the same proportional change of resistance caused by temperature changes in the medium, independently of degree of corrosion of the element 12. Corrosion products accumulating on the element 12 do not appreciably alter these relationships.

Disgressing momentarily from the preferred arrangement under discussion with reference to FIGURE 1, an alternative form of probe which may be represented as in FIGURE 1 includes the use of a resistance element 14 of essentially non-corrosive material requiring no anti-corrosion coating thereon, or of a non-coated corrosible material which is cathodically protected, where in any such case the material has substantially the same temperature-resistance characteristics as that of the element 12. Still another alternative form which may likewise be represented by the same drawing figure is one in which the second resistance element, 14, is of the same material as the first element, 12, but is exposed to the corrosive action of the medium M to corrode therein. In this latter case, however, the element 14 is of materially larger cross-section than the element 12, so that its resistance changes at a different rate with corrosion than the first element. Theoretically in this latter case it is desirable to have the element 14 many times thicker than the element 12, however practical measurement circuit considerations, i.e., obtaining a high degree of sensitivity in the measuring circuit, limit the ratio of thicknesses to of the order of two or three. Even then the measuring circuit calibration will necessarily be on a different basis than in the first-described and preferred arrangement wherein the resistance element 14 does not corrode.

The probe P is conveniently constructed with five electrical terminals P1, P2, P3, P4 and P5, accessible on the side thereof opposite from the projecting resistance elements 12 and 14. The terminals P1 and P2 are connected electrically to one end of the resistance element 12. The terminal P3 is connected to the juncture of resistance elements 12 and 14. The terminals P4 and P5 are connected to the opposite end of the element 14. These five terminals may be formed in a suitable plug or socket releasably engageable with a complemental socket or plug of the metering circuit C for convenience in connecting and disconnecting the metering circuit to and from the installed probe.

The metering circuit C is of the bridge type. One corner of the bridge is formed by the wiper contact 16a of the slide-wire resistance 16. The two adjoining arms of the bridge are formed by the respective sections of the slide-wire winding and the resistances 18 and 20 connected in series therewith respectively. The remaining two arms of the bridge are formed by the electrical resistance elements 12 and 14, respectively. A null-reading galvanometer 22 is connected between the wiper 16a and the probe terminal P3. The bridge circuit is energized by a battery 24 or other suitable source, whether A.C. or D.C., through the closed contacts of the normally open energy-conserving switch 26 and the current-limiting resistance 28 connected serially with the source 24.

In operation, with the probe P installed as illustrated and described, the bridge is initially balanced and calibrated so that at the time of installation the slide-wire wiper 16a is positioned along scale S to read zero corrosion when the switch 26 is closed and the galvanometer 22 indicates the null or bridge-balanced condition. As corrosion of the element 12 takes place, the bridge circuit becomes progressively unbalanced from the initial setting of the wiper 16a and in order to rebalance the same so that the galvanometer 22 again indicates a null condition, it is necessary to move the wiper 16a to a new position. The amount of displacement of the wiper 16a necessary to rebalance the circuit is determined by the change of resistance of the element 12 since the previous balance setting of the wiper, hence represents the amount of corrosion taking place in the interim and by suitably calibrating the scale S may be read directly therefrom. If desired the scale S may be calibrated in terms of total corrosion of tubing W from the time of initial installation of the probe. In any case no corrections of the readings for the effects of temperature changes in the corrosive medium M are necessary due to the temperature compensation afforded by the second resistance element 14 similar to the element 12 as previously explained. Successive readings may be taken as often as desired, separated by known time intervals, in order to determine corrosion progress and rate of corrosion over an extended time period.

It is, of course, readily obvious that the probe P may be fixedly installed in the medium to remain there during its entire useful life and thereby provide continual information regarding total corrosion and rate of corrosion of the tubing W or other object. If only rate of corrosion is of interest the probe may be moved from place to place in order at the necessary intervals to measure corrosiveness of the medium in different localities.

In some installations the corrosive fluid may flow at relatively high velocities and thereby tend to damage any fine-wire resistance elements exposed to the medium without physical protection as in FIGURE 1. The arrangement illustrated in FIGURE 2 overcomes this problem by mounting on the insulating base 10' of the test probe P' a cylindrical screen 30 protectively surrounding the resistance elements projecting into the medium. The screen has little or no effect on rate of corrosion of the exposed resistance element; moreover, since the screen is floating in electrical potential its presence has no effect electrolytically on the operation of the resistance measuring apparatus. Its presence as a thermal conductor surrounding the test elements also tends to minimize temperature differences between such elements because of the semi-isothermal zone which it creates.

FIGURE 2 also illustrates a modified probe configuration in that the corrosible resistance element 12' is not formed as a loop throughout its exposed length but only as a half loop, which is also true of the coated resistance element 14'. In this case the junction between these elements is formed at their projecting outer ends, and the electrical conductor 32 connecting this junction to the probe terminal P3 is electrically insulated and protected from the fluid medium throughout its entire length. An advantage of this configuration over that shown in FIGURE 1 is that the insulated conductor 32 may be relatively stiff and rigid so as to provide mechanical support for the elongated resistance elements 12' and 14'. Another advantage of this modified configuration is that ion migration between opposite-potential ends of the exposed resistance element 12 during application of test voltages to the elements in FIGURE 1 may influence accuracy of the measurements and itself produce accelerated or abnormal corrosion of the element 12 during the tests. This possibility is materially lessened by locating opposite-potential ends of the corrosible resistance element relatively far apart as in the resistance element configuration in FIGURE 2. The probe materials, the supporting base, the electrical terminals on the probe and other details of the probe shown in FIGURE 2 may otherwise be similar to that illustrated in FIGURE 1.

It will be apparent that the actual electrical resistance of the exposed resistance element 12 in FIGURE 1 is proportional to the physical length of such element and is inversely proportional to the cross-sectional area thereof. In order to employ wires of sufficient diameter to possess the requisite physical strength and life in the corrosive medium, the wire should be relatively long, otherwise the resolution or accuracy of the resistance readings as a measure of corrosion will be impaired. FIGURE 3 illustrates a convenient arrangement for providing a relatively compact probe wherein the wires have appreciable length. In this case both the exposed corrosible element 12" and the protectively coated element 14" are of helical configuration. These helices are placed in side-by-side relationship, but may be mounted coaxially or concentrically if desired. In other respects the probe is constructed similarly to the arrangement shown in FIGURE 2 and with the attendant advantages thereof, except the optional screen 30 is omitted.

The selection of length and thickness for the resistance elements of the probe is governed by different considerations. While the exposed metal specimen or resistance element can be of many different configurations and cross-sectional shapes, the preferred element is a thin, long wire of circular cross section formed of the metal whose corrosion progress is to be monitored. Wires of small diameter afford greater sensitivity in a bridge type metering circuit but result in shorter useful life. Long resistance element wires also afford greater sensitivity in the bridge-type metering circuit, but add bulk to the probe, one solution to which is the arrangement in FIGURE 3. In general there is no critical length requirement of the wire but it will be apparent that a greater length gives greater sensitivity. In this regard it is found that for most applications resistance elements of a length ranging from two to twenty inches are suitable. Similarly, the wire diameter is not critical but it is found in practice that for most applications thicknesses ranging from 10 to 200 mils are suitable. Typical cross-sectional wire shapes are shown in FIGURE 4, wherein a round wire 12a is employed, and in FIGURE 5, wherein a flat or ribbon-like wire 12b is employed. A circular wire furnishes maximum strength per unit weight of the wire of a given material and may be preferred for that reason and because of its ready availability commercially in various different sizes and materials. However, a thin ribbon-like wire or band has the advantage for bridge calibration purposes that the resistance of the element varies approximately linearly with penetration of the corrosive effect, whereas in the case of a circular wire, the presently preferred type, the resistance change, while a smooth and continuous change, is in accordance with the square of the decreasing wire diameter.

The bridge circuit may be designed and calibrated to provide a substantially linear relationship between scale graduations and amount of corrosion penetration in the monitored object (W, for example). By so doing decade boxes may be substituted for the resistances 18 and 20 in order to extend the range and resolution of the circuit according to well known principles. There are a number of ways to achieve the desired linear relationship involving selection of different circuit elements. For example, in the case of a probe comprising a protectively coated compensating resistance element this may be done by selecting a corrosion-protected resistance element 14 having a resistance initially substantially equal to that of the exposed resistance element 12 and by limiting the use of the probe to a period of operation in which the resistance of the exposed resistance element 12 has increased by six hundred percent. The amount of resistance increase which may be tolerated with a linearly calibrated scale depends on the circuit constants chosen and the required accuracy of the readings.

Figure 6:
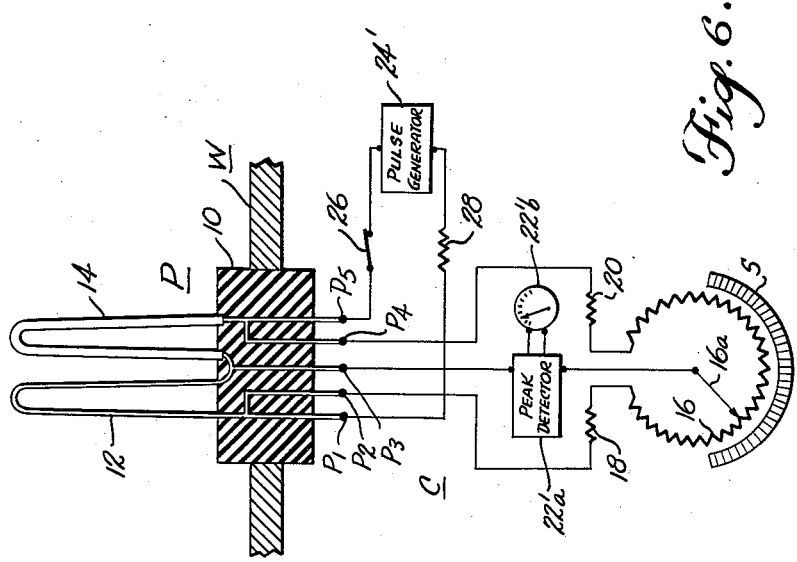
FIGURE 6 is a schematic diagram of a modified system for measuring corrosion by the basic method shown in FIGURE 1.

A refinement of the metering system illustrated in FIGURE 1 is shown in FIGURE 6, wherein the direct current source 24 is replaced by a pulsating type of source designated the pulse generator, 24'. In this case the direct null-reading meter 22 of FIGURE 1 is replaced by a peak detector circuit 22'a feeding a null-reading meter 22'b. The peak detector circuit is of any suitable type capable of providing a continuous direct voltage of one polarity or the other, depending upon the direction or sense of bridge unbalance, for actuating a null-reading galvanometer (22'b). By passing short discrete impulses of current through the probe resistance elements, with a relatively long interval between successive pulses, the peak current flow through the bridge circuit may be relatively high in magnitude to furnish convenient metering circuit voltages, but the average current will be low. A low average current through the corrosible resistance element of the probe has the advantage that any electrolytic action involving such element during the taking of corrosion readings will be reduced to a minimum.

In FIGURE 7 the bridge circuit has been somewhat revised by employing fixed resistance elements 18' and 20' in place of the combined resistances of the elements 18 and 20 with the sections of the slide-wire winding 16 as in FIGURES 1 and 6. Moreover, the null-reading galvanometer 22 has been replaced by a recording galvanometer 34 by which a permanent record of the changing resistance ratio of the elements 12 and 14 is made by the stylus 34b on the graph paper 34a over any desired time period.

It will therefore be evident that the invention provides a novel and effective means and method for measuring corrosion and rate of corrosion in a wide variety of applications, having the advantages set forth at the outset and others related thereto. By proper selection of resistance element size in the probe the probe will have a useful installed life of months or years, depending upon the corrosiveness of the medium. After the probe is once inserted it need not be removed or reinserted until it is excessively depleted by corrosion, hence the measuring technique does not require shutting down operations involving the corrosive medium and does not interfere with usage or functioning of the fluid medium or any associated apparatus. The method is highly sensitive and accurate; it has been found possible utilizing a metering circuit having conventional electrical components to measure accurately corrosion penetration as slight as one-millionth of an inch and less. Furthermore, it has been determined that there is close correspondence between the rate of corrosion of large metallic objects such as oil well tubing and the small wire-like resistance elements used in the probe, when made of the same metal. By employing two resistance elements, one exposed to the corrosive action of the medium and the other protected thereagainst, but not appreciably insulated thermally from the medium, the effects of temperature fluctuations on the readings are eliminated. Since the corrosion products which accumulate on the surface of the exposed resistance element have a very high resistivity compared to the resistivity of metals, the amount of corrosion products present does not appreciably affect the readings. By proper design of the measuring circuit corrosion progress may be read or recorded directly in units of thickness of metal loss from the exposed specimen or resistance element, hence from any object whose corrosion rate is being monitored, as described.

We claim as our invention:

1. Apparatus for measuring corrosion of an electrically conductive material in a corrosive medium comprising, in combination, probe means including a first electrical resistance element formed of such material, a second electrical resistance element having a temperature-resistance characteristic similar to that of said first element, support means connected to said elements for supporting the same in and exposed to the corrosive medium, both of said elements being subject to temperature variations in said medium, electric terminals on said resistance elements, and electric circuit means connected to said elements, including a voltage source connected for passing electric current through said elements simultaneously, said circuit means including means measuring changes in the ratio of electrical resistances of said elements in situ, thereby to measure changes in electrical resistance of said first element compensated for temperature variations of said medium, for indicating the amount of corrosion of said first element, said voltage source being operable to produce impulses of voltage having a relatively high ratio of peak value to average value, applied simultaneously to said elements through the connections thereof to said source.

2. Apparatus for measuring corrosion of an electrically conductive material in a corrosive medium comprising, in combination, probe means including a first electrical resistance element formed of such material, a second electrical resistance element having a temperature-resistance characteristic similar to that of said first element, support means connected to said elements for supporting the same in and exposed to the corrosive medium, both of said elements being subject to temperature variations in said medium, electric terminals on said resistance elements, and electric circuit means connected to said elements, including a voltage source connected for passing electric current through said elements simultaneously, said circuit means including means measuring changes in the ratio of electrical resistances of said elements in situ, thereby to measure changes in electrical resistance of said first element compensated for temperature variations of said medium, for indicating the amount of corrosion of said first element, said electric circuit means comprising a bridge circuit having two mutually adjacent arms including the respective resistance elements, two other mutually adjacent arms including resistance means variable to increase the resistance in one such arm while correspondingly decreasing the resistance in the other such arm, the source of voltage being connected between the relatively nonadjacent ends of the first two arms, and null-indicating means connected between the junction of the first two arms and the junction of the second two arms.

3. Apparatus for measuring corrosion of an electrically conductive material in a corrosive medium comprising, in combination, probe means including a first electrical resistance element formed of such material, a second electrical resistance element having a temperature-resistance characteristic similar to that of said first element, support means connected to said elements for supporting the same in and exposed to the corrosive medium, said first element having a substantially smaller cross-sectional area than that of said second element to undergo a change of resistance thereby at a rate materially greater than any such rate of change in the second element, but both of said elements being subject to temperature variations in said medium, and electric terminals on said resistance elements, and electric circuit means including a voltage source connected to both of said elements for passing electric current through both elements simultaneously, and indicator means connected to both of said elements, said indicator means including sensing means adapted to sense differences in the existing ratio of the respective voltage across said elements, and means cooperable with said sensing means to measure changes in such ratio, and thereby changes in the ratio of resistances of said elements compensated for the effect of temperature variations of said medium.

4. The apparatus defined in claim 3, wherein the probe support means includes an insulating base and an insulated electrical conductor projecting outwardly from one side of said base, and wherein the first and second electrical resistance elements project outwardly from said base in a direction generally transverse to said base side and have outer ends connected electrically directly to the projecting end of said insulated electrical conductor.

5. The apparatus defined in claim 3, wherein the probe means includes a supporting base carrying the resistance elements projecting from one side thereof, and a protective metal screen mounted on said base encircling said projecting resistance elements out of contact therewith.

6. The apparatus defined in claim 3, wherein the probe means includes a supporting base and at least one of the electrical resistance elements is of spiral configuration projecting outwardly from one side thereof.

7. Probe means for measuring corrosion of an electrically conductive material in a corrosive medium comprising in combination, a base adapted to be mounted for projection of the probe means into said medium, said base having an inner side facing into and exposed to said medium, a relatively thin and elongated electrical resistance element formed of said material, first electrical conductor means extending through said base and joined to one end of said exposed resistance element adjacent said inner side of said base, second electrical conductor means extending through said base and projecting transversely from said inner base side into the medium and joined to the opposite end of said exposed resistance element, said resistance element extending generally parallel to said second conductor means and deriving at least part of its support therefrom, means substantially impervious to the corrosive medium electrically insulating said second electrical conductor means substantially continuously from said base side over a material portion of the projecting length of said second conductor means in the corrosive medium, and a second resistance element of a material having substantially the same temperature-resistance characteristic as the material of the first resistance element, a third electrical conductor means extending through the base and joined to one end of said second resistance element adjacent the inner side of the base, said second resistance element being joined by its opposite end to the second electrical conductor means in generally parallel relation thereto and having a thin coating of material substantially impervious to corrosive attack by the medium, thereby to protect said second resistance element against corrosion during corrosion of the first resistance element.

8. A corrosion test probe comprising in combination, a base having a surface adapted to be exposed to a corrosive medium and a surface opposite thereto adapted not to be exposed to said medium, three electrical leads, a corrodible, ribbon-like metallic resistance element having a thickness not more than about 0.01 inch electrically connected to one of said leads adjacent said exposed surface of said base, a second ribbon-like resistance element of substantially the same size, composition and resistance characteristics as said first resistance element electrically connected at one end to a second of said three leads adjacent the exposed surface of said base, said resistance elements being electrically connected at their other ends to the third of said leads, one of said resistance elements being coated with a protective, corrosion-resistant coating and the other being bare, all three of said leads extending outwardly of said base through said non-exposed surface and being electrically insulated from said base and from each other.

9. Apparatus for measuring corrosion of an electrically conductive metallic material in a corrosive medium comprising in combination a probe in accordance with claim 8 and an electric bridge circuit comprising said two resistance elements in adjacent arms thereof and other resistances in the remaining two arms of said circuit, a galvanometer connected between the junction of the arms containing said first and second resistances and the junction of said remaining two arms, and a voltage source connected between the remaining two opposite junctions of said bridge circuit said base comprising support means on which said first and second resistance elements are mounted in electrically-insulated relationship and in such manner as to enable said first and second elements to be placed in the corrosive medium without exposing other elements of the bridge circuit thereto.

10. The method of determining the rate of corrosion of a corrodible metal exposed to a corrosive medium comprising connecting a ribbon-like specimen of said metal in one arm of a bridge circuit having four arms serially connected in closed circuit to form four junctures, connecting a similar specimen of said metal in an adjacent arm of said bridge circuit, exposing said first-mentioned specimen to the corrosive medium, simultaneously subjecting the second-mentioned specimen to the conditions of temperature existing in said corrosive medium without exposing it to the corrosive influence of said corrosive medium, measuring the change in potential across the juncture of the two arms containing said specimens and the juncture opposite thereto during the period said first-mentioned specimen is exposed to the corrosive medium and simultaneously impressing a potential across the remaining two junctures of the bridge.

11. Probe means for measuring corrosion of an electrically conductive material in a corrosive medium comprising in combination, a base adapted to be mounted for projection of the probe means into said medium, said base having an inner side facing into and exposed to said medium, a relatively thin and elongated electrical resistance element formed of said material, first electrical conductor means extending through said base and joined to one end of said exposed resistance element adjacent said inner side of said base, second electrical conductor means extending through said base and projecting transversely from said inner base side into the medium and joined to the opposite end of said exposed resistance element, said resistance element extending generally parallel to said second conductor means and deriving at least part of its support therefrom, and means substantially impervious to the corrosive medium electrically insulating said second electrical conductor means substantially continuously from said base side over a material portion of the projecting length of said second conductor means in the corrosive medium.

12. Probe means for measuring corrosion of an electrically conductive material in a corrosive medium comprising in combination, a base adapted to be mounted for projection of the probe means into said medium, said base having an inner side facing into and exposed to said medium, a relatively thin and elongated electrical resistance element formed of said material, first electrical conductor means extending through said base and joined to one end of said exposed resistance element, second electrical conductor means extending through said base and projecting from said inner base side into the medium and joined to the opposite end of said exposed resistance element; said resistance element extending generally parallel to said second conductor means and deriving at least part of its support therefrom, means substantially impervious to the corrosive medium electrically insulating said second electrical conductor means substantially continuously from said base side over a material portion of the projecting length of said second conductor means in the corrosive medium, and a second resistance element of a material having substantially the same temperature-resistance characteristic as the material of the first resistance element; a third electrical conductor means extending through the base and joined to one end of said second resistance element, said second resistance element being joined by its opposite end to the second electrical conductor means in generally parallel relation thereto and having a thin coating of material substantially impervious to corrosive attack by the medium thereby to protect said second resistance element against corrosion during corrosion of the first resistance element.

13. An apparatus for measuring corrosion of an electrically conductive metallic material in a corrosive medium comprising a probe, first and second resistance elements carried by said probe and being in series connection electrically, both said resistance elements having the same variation in electrical resistance with changes in temperature, said first resistance element being exposed to and thereby corrodible by the corrosive medium, said second resistance element being exposed to temperature variations occurring in said corrosive medium and resistance changes occasioned thereby but being protected against corrosion from said corrosive medium by a non-corrosive covering, a pair of electrical resistances remote from said probe, electrical leads interconnecting the resistance elements in said probe with said remote electrical resistances to form a bridge circuit in which the resistances in said probe form adjacent arms, a current responsive device connected across one of the opposite junctions of the bridge circuit, and a voltage source connected across the remaining opposite junction of said bridge circuit.

14. Apparatus for measuring corrosion of an electrically conductive material in a corrosive medium comprising, in combination, probe means including a first electrical resistance element formed of such material, a second electrical resistance element having a temperature-resistance characteristic similar to that of said first element, support means connected to said elements for supporting the same in and exposed to the corrosive medium, said first element being subject to corrosion by the medium to undergo a change of resistance thereby, means protecting said second element against corrosion by said medium, both of said elements being subject to temperature variations in said medium, electric circuit means including a power source connected to both of said elements for passing electric current through both elements simultaneously, indicator means connected to both of said elements, said indicator means including sensing means adapted to sense the existing ratio of the voltages across said elements, said indicator means being operable to measure changes in such ratio and thereby changes in the ratio of resistances of said elements compensated for the effect of temperature variations of said medium.

15. Apparatus for measuring corrosion of an electrically conductive material in a corrosive medium comprising, in combination, probe means including a first electrical resistance element formed of such material, a second electrical resistance element having a temperature-resistance characteristic similar to that of said first element, support means connected to said elements for supporting the same in and exposed to the corrosive medium, both of said elements being subject to temperature variations in said medium, electric circuit means connected to said elements, including a power source for passing electric current through said elements simultaneously, said circuit means including means measuring changes in the ratio of electrical resistances of said elements in situ, thereby to measure changes in electrical resistance of said first element compensated for temperature variations of said medium, for indicating the amount of corrosion of said first element, said electric circuit means including a null indicator and a bridge circuit adjustable to produce a null condition.

16. An apparatus for measuring corrosion of an electrically conductive medium in a corrosive medium comprising probe means including an electrically conducting corrodible element, a second electrically conducting element, said second element having a temperature-resistance characteristic substantially the same as that of said first element, said second element being electrically and thermally continuous with said first element, means about the periphery of said second element protecting the same against corrosion by said corrosive medium, a pair of resistors in series connected across the free ends of said first and second elements, said two elements and said pair of resistors thereby providing an electrical resistance bridge circuit with said first and second elements in adjacent arms thereof, means for applying an electrical potential across two opposed junctions of said bridge circuit to thereby energize said first and second elements simultaneously, and indicator means connected across the other opposed junctions of said bridge circuit to provide an indication of the change in resistance ratio between said first and second elements as corrosion of said first element occurs.

17. The apparatus of claim 16 in which said voltage source is a pulsating source.

18. The apparatus of claim 16 in which said corrodible element is in the form of a helix.

19. The apparatus of claim 16 which also includes a protective sheath surrounding said corrodible element, said sheath having openings therein permitting ingress and egress of corrosive fluid to said corrodible element.

20. An apparatus for measuring corrosion of an electrically conductive medium in a corrosive medium comprising a single corrodible electrically conductive element of uniform cross-section, a portion of said corrodible element being bare, and another portion of said element being protected against corrosion by a corrosion resistant composition disposed about its periphery, a pair of resistors connected across the ends of said element to thereby form a bridge circuit consisting of the corrodible and non-corroding portions of said element, and said two resistors, means for applying an electrical potential across two opposed arms of said bridge circuit, and current responsive indicating means connected across the other opposed arms of said bridge circuit to provide an indication of the change in resistance ratio between the corrodible and non-corroding portions of said elements as corrosion of said corrodible portion occurs.

21. The method of detecting corrosion of a corrodible metal exposed to a corrosive medium comprising connecting a specimen of said metal in one arm of a bridge circuit having four arms serially connected in closed circuit to form four junctures, connecting a similar specimen of said metal in an adjacent arm of said bridge circuit, exposing both specimens to the temperature of the corrosive medium while protecting said similar specimen against corrosion by said medium, determining the change in potential across the juncture of the two arms connecting said specimens and the juncture opposite thereto during the period said first-mentioned specimen is exposed to the corrosive medium, and simultaneously flowing electric current between the remaining two junctures of the bridge.

References Cited in the file of this patent
UNITED STATES PATENTS

| | | |
|---|---|---|
| 1,978,440 | Shepard | Oct. 30, 1934 |
| 2,531,145 | Marco et al. | Nov. 21, 1950 |
| 2,735,754 | Dravnieks | Feb. 21, 1956 |
| 2,764,892 | Rosenthal | Oct. 2, 1956 |